(12) United States Patent
Kim

(10) Patent No.: US 7,609,607 B2
(45) Date of Patent: Oct. 27, 2009

(54) DIFFRACTION ELEMENT AND OPTICAL PICK-UP APPARATUS HAVING THE SAME

(75) Inventor: Bong-gi Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 603 days.

(21) Appl. No.: 11/254,697

(22) Filed: Oct. 21, 2005

(65) Prior Publication Data

US 2006/0158996 A1 Jul. 20, 2006

(30) Foreign Application Priority Data

Jan. 20, 2005 (KR) .............. 10-2005-0005474

(51) Int. Cl.
*G11B 7/135* (2006.01)
(52) U.S. Cl. .............. 369/112.12; 369/112.03; 369/112.07
(58) Field of Classification Search .......... 369/110.03, 369/112.03, 112.07, 112.12
See application file for complete search history.

(56) References Cited

U.S. PATENT DOCUMENTS

| 4,983,017 | A | * | 1/1991 | Tsuji et al. ............... 359/566 |
| 5,066,138 | A | * | 11/1991 | Toide et al. ............. 369/112.1 |
| 5,128,914 | A | | 7/1992 | Kurata et al. |
| 5,216,649 | A | * | 6/1993 | Koike et al. ............. 369/44.23 |
| 5,835,471 | A | * | 11/1998 | Miyamoto et al. ..... 369/112.07 |
| 5,886,964 | A | * | 3/1999 | Fujita ..................... 369/44.37 |
| 7,095,942 | B2 | * | 8/2006 | Lin et al. ................ 385/146 |
| 7,161,890 | B2 | * | 1/2007 | Komma et al. ......... 369/112.07 |
| 2003/0053211 | A1 | * | 3/2003 | Takasuka et al. ........... 359/569 |
| 2003/0053393 | A1 | * | 3/2003 | Shimano et al. ........ 369/112.02 |
| 2003/0053397 | A1 | * | 3/2003 | Katayama et al. ...... 369/112.17 |
| 2004/0081064 | A1 | | 4/2004 | Ohnishi et al. |
| 2005/0002313 | A1 | | 1/2005 | Hayashi |

FOREIGN PATENT DOCUMENTS

| EP | 0 378 438 A | 7/1990 |
| JP | 01-260644 | 10/1989 |
| JP | 02-027534 | 1/1990 |
| JP | 02-187936 | 7/1990 |
| JP | 09-091737 | 4/1997 |
| JP | 2000-292617 | 10/2000 |
| JP | 2004-091856 | 3/2003 |
| JP | 2004-063073 | 2/2004 |
| JP | 2004-334962 | 11/2004 |

\* cited by examiner

*Primary Examiner*—Wayne R Young
*Assistant Examiner*—Lixi Chow
(74) *Attorney, Agent, or Firm*—Roylance, Abrams, Berdo & Goodman, L.L.P.

(57) ABSTRACT

A diffraction element for use in an optical pick-up is capable of calculating a TE signal more stably irrespective of any assembly error in optical elements. The diffraction element of the invention is divided into three areas, a first, a second, and a third area. Each area comprises a diffraction grating with a predetermined period, and the second area is provided between the first area and the third area. The diffraction grating of the first area is substantially parallel to the diffraction grating of the third area, and the diffraction grating of the second area is substantially perpendicular to the diffraction gratings of the first and the third area.

7 Claims, 6 Drawing Sheets

DIFFRACTION ELEMENT AND OPTICAL PICK-UP APPARATUS HAVING THE SAME

CROSS-REFERENCE TO RELATED APPLICATIONS

This application claims the benefit under 35 U.S.C. § 119(a) of Korean Patent Application No. 2005-5474, filed on Jan. 20, 2005, the entire content of which is hereby incorporated by reference.

BACKGROUND OF THE INVENTION

1. Field of the Invention

The present invention generally relates to an optical pick-up apparatus. More specifically, the present invention relates to a diffraction element and an optical pick-up apparatus having the same that has improved tracking control.

2. Description of the Related Art

Optical pick-up apparatuses are employed in devices such as compact disk (CD) players, digital versatile disk (DVD) players, compact disk-read only memory (CD-ROM) drives and so forth to record and/or reproduce information onto or from a disc which is an optical recording medium without contact. To record data, the optical pick-up irradiates a laser beam onto a track on the surface of the disc to form a pit train and record a data bit. To reproduce the recorded data, the optical pick-up optically reads pit data formed on the disc, and outputs an electrical signal corresponding to the recorded data. To this end, the optical pick-up includes a plurality of optical elements, for example, a light diode as a light source for emitting a laser beam, a diffraction element, a beam splitter to adjust the deflection of the laser beam, an object lens for forming an optical path and forming a spot (that is, focusing the laser beam) on the disc, an optical detector for detecting a signal and so on.

The optical pick-up apparatus controls the object lens in the vertical direction, so that a beam spot can be focused on the surface of the disc (this is called a focus control). The optical pick-up apparatus also controls the object lens in the horizontal direction, so that the beam can follow the track (this is called a tracking control). To carry out the focus control and the tracking control, a focus error signal (which will be referred to as a "FE signal") and a tracking error signal (which will be referred to as a "TE signal") should be generated. In general, an astigmatic method is used to generate the FE signal. Also, a push pull method (which will be referred to as "PP method") and a differential push pull method (which will be referred to as "DPP method") are used to generate the TE signal. In the PP method, a single laser beam is used and whether an optical spot is formed at the center of a track is detected based on the intensity of an incident beam on each area of a photodetecting element that is divided into two areas. As the object lens shifts and tilts for performing tracking servo, a DC offset is caused to the TE signal.

For this reason, the DPP method (also called the 3-beam method) is sometimes used for tracking control. In the DPP method, a laser beam is split into a main beam that is scanned on the center of a track and two sub-beams spaced apart from the main beam by a predetermined distance in the radial and tangential directions respectively, and scanned on the periphery of a groove. The DPP method uses the difference in signals obtained from the three laser beams to correct for the DC offset of the TE signal. When the DPP method is applied to a disc having different track pitches, the sub-beams are not formed on the groove. Therefore, correcting the DC offset of the TE signal in discs having different track pitches remains a problem to be resolved.

Japanese Patent application No. 2004-63073 discloses a method for radiating three beams onto one track to attempt to solve the above-described problem. To give a brief description of the method referring to FIG. 1, a diffraction element 10 is divided into first, second and third areas 12, 14, 16, and the diffraction gratings of each area 12, 14, 16 are dislocated ¼ pitch (P/4) from one another. An incident beam on the diffraction element 10 is diffracted and split into the $0^{th}$ order main beam MB and the $\pm 1^{st}$ order sub-beams SB1, SB2. Although the main beam MB does not generate a phase difference, the first and second sub-beams SB1, SB2 generate relative phase differences at −90°, 0°, and 90°, respectively. In each sub-beam SB1, SB2, the (−90) degree phase difference is generated by the first area 12 of the diffraction element 10, the 0 degree phase difference is generated by the second area 14 of the diffraction element 10, and the 90 degree phase difference is generated by the third area 16 of the diffraction element 10.

Referring now to FIG. 2, the main beam MB and the sub-beams SB1, SB2 are reflected from the disc, and diffracted again into three beams (MBa, MBb, MBc), (SB1a, SB1b, SB1c), and (SB2a, SB2b, SB2c), respectively. Especially, the three beams SB1a, SB1b, SB1c diffracted from the first sub-beam SB1 incident on the disc and the three beams SB2a, SB2b, SB2c diffracted from the second sub-beam SB2 incident on the disc coincide with the positions where the phase differences of the first and second sub-beams SB1, SB2 are generated by the first, second and third areas 12, 14, 16 of the diffraction element 10.

As shown in FIG. 2, the diffracted beams (MBa, MBb, MBc), (SB1a, SB1b, SB1c), and (SB2a, SB2b, SB2c) from the main beam MB and the first and second sub-beams SB1, SB2, respectively, interfere with one another, and received by a photodetecting element 22 of the optical detector 20 for use in the main beam and photodetecting elements 24, 26 of the optical detector 20 for use in the sub-beams.

In practice, however, a light beam from the light source sometimes does not pass through the center of the diffraction element because of assembly errors in the diffraction element 10 or other optical elements that occur while assembling the optical pick-up apparatus. In this case, the diffraction element 10 does not generate a phase difference in the main beam MB. Thus, although the light beam emitted from the light source may not pass though the center of the diffraction element 10, the sizes of interfered beams MBb, MBc penetrating a center beam MBa are uniform. As such, an MPP (Main beam Push Pull) signal does not generate an error. On the other hand, in the case of sub-beams SB1, SB2, the interfered beams (SB1b, SB1c) and (SB2a, SB2b) that penetrate the center beams SB1a, SB2a often incline toward one side of the photodetecting elements 24 and 26 due to the above-described assembly errors. This produces errors in SPP1 (Sub beam Push Pull 1), which is calculated using a signal from the first sub-beam use photodetecting element 24, and errors in SPP2 (Sub beam Push Pull 2), which is calculated using a signal from the second sub-beam use photodetecting element 26. Unfortunately, these errors do not cancel each other out if the SPP1 and the SPP2 are added, but rather, increase even more. Eventually, these errors cause an error in the DPP (Differential Push Pull) signal which is the TF signal. This problem gets particularly severe in a DVD-RAM because it has a relatively long distance between a groove and a land.

Accordingly, there is a need for an improved optical apparatus that minimizes tracking errors.

SUMMARY OF THE INVENTION

An aspect of the present invention is to solve at least the above problems and/or disadvantages and to provide at least the advantages described below. Accordingly, an aspect of the present invention is to provide a diffraction element and an optical pick-up apparatus having the same, that is capable of stably detecting a TE signal despite any assembly errors in the optical elements.

In accordance with an aspect of the present invention, a diffraction element for use in an optical pick-up apparatus is divided into three areas, a first, a second and a third area. Each area comprises a diffraction grating with a predetermined period. The second area is provided between the first area and the third area. The diffraction grating of the first area is substantially parallel to the diffraction grating of the third area, whereas the diffraction grating of the second area is substantially perpendicular to the diffraction gratings of the first and the third area.

In accordance with an aspect of the present invention, an optical pick-up apparatus includes a light source and a diffraction element divided into three areas, a first, a second and a third area. Each area comprises a diffraction grating with a predetermined period, and the second area is disposed between the first area and the third area. The diffraction element diffracts a light beam emitted from the light source into three beams. An optical system irradiates the beam diffracted by the diffraction element onto an optical recording medium, and guides light reflected from the optical recording medium. A photo diode integrated circuit (PDIC) receives the light guided by the optical system, and detects an RF signal, an FE signal, and a TE signal. The diffraction grating of the first area is substantially parallel to the diffraction grating of the third area, whereas the diffraction grating of the second area is substantially perpendicular to the diffraction gratings of the first and the third area.

In an exemplary embodiment, the diffraction gratings of the first and the second area are dislocated by 180 degrees from each other, and the diffraction gratings of the first and the third area are formed along the radial direction of an optical recording medium. Preferably, the light source includes a first light source for a DVD and a second light source for a CD, and the diffraction element includes a first and a second diffraction element for diffracting lights emitted from the first and the second light source, respectively. Meanwhile, the optical system includes a first beam splitter for changing the optical path of the light emitted from the first light source and transmitting the light emitted from the second light source, a second beam splitter for changing the optical path of the light emitted from the first beam splitter and guiding the light reflected from the optical recording medium towards the PDIC, a collimating lens for collimating the light emitted from the second beam splitter, and an optical objective lens for focusing the light from the collimating lens onto the optical recording medium.

BRIEF DESCRIPTION OF THE DRAWINGS

The above and other objects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
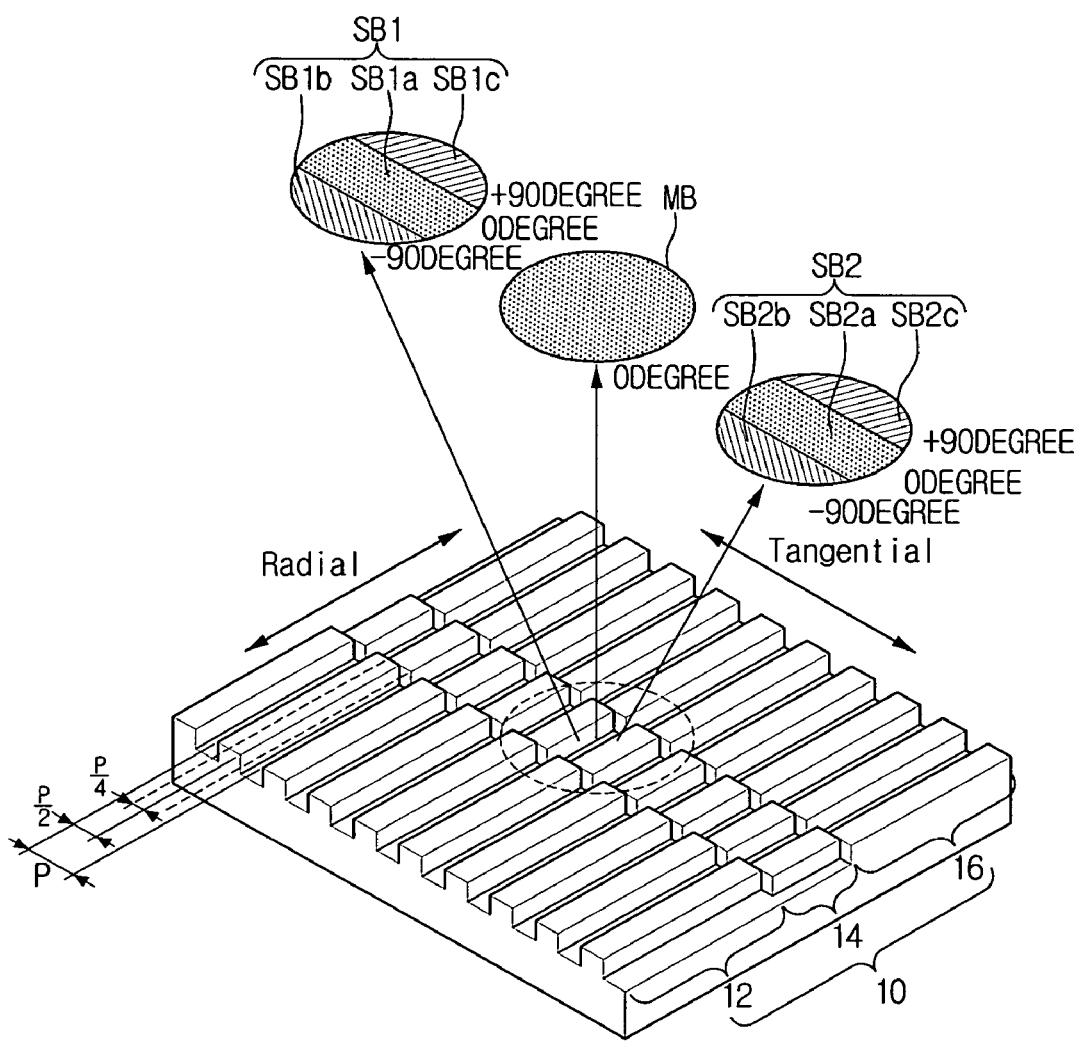
FIG. 1 is a schematic perspective view of a related art diffraction element.
Figure 2:
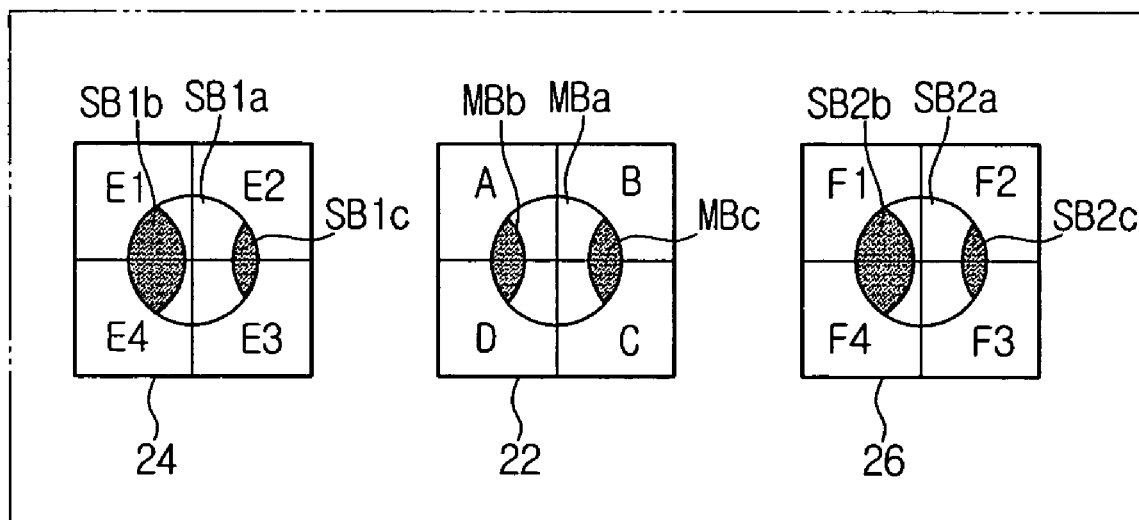
FIG. 2 is a plan view illustrating a state where a diffracted light beam from the diffraction element in FIG. 1 is received by a photodetecting element.
Figure 3:
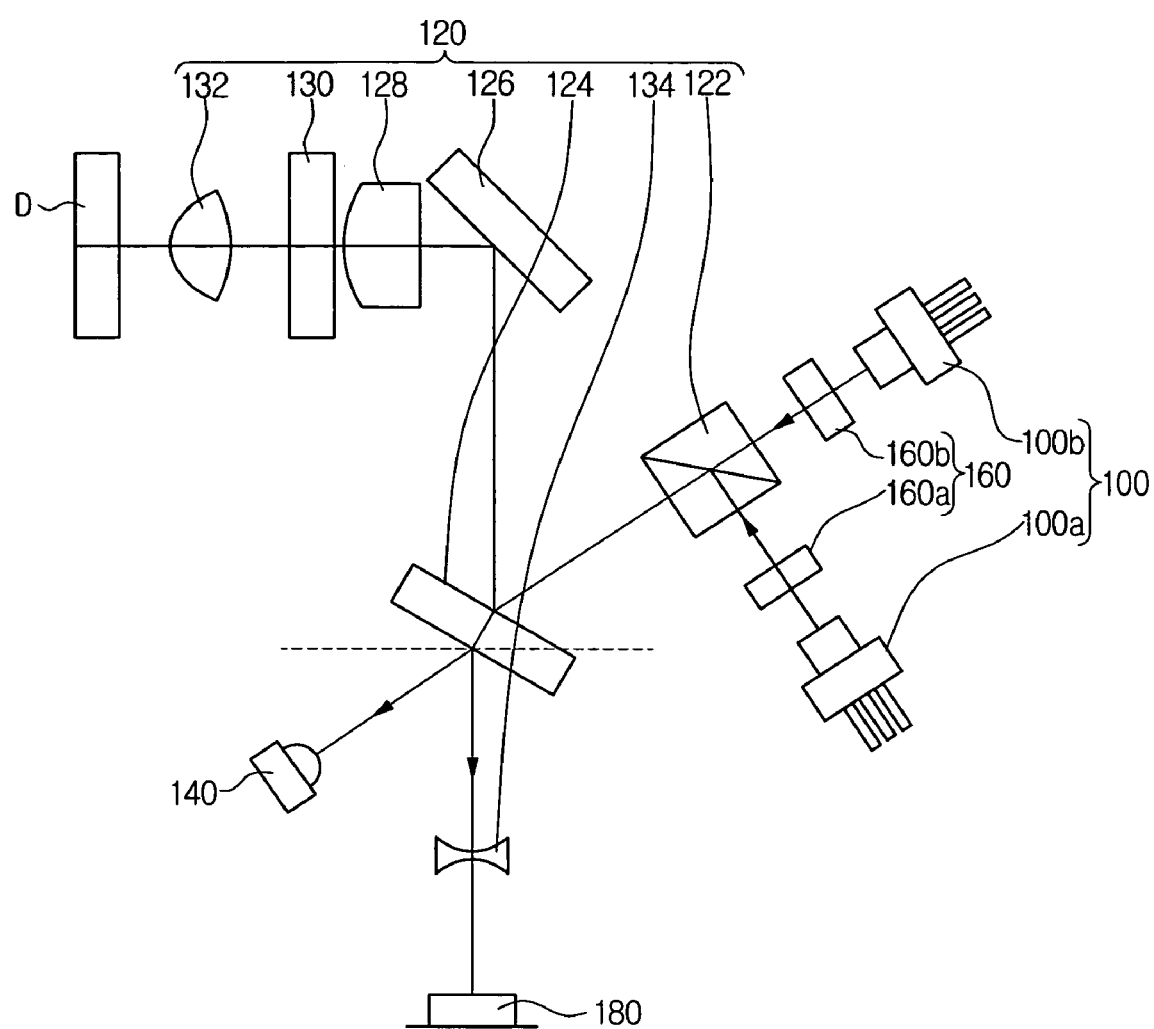
FIG. 3 is a schematic view of an optical pick-up apparatus according to one exemplary embodiment of the present invention.

Referring to FIG. 3, an optical pick-up apparatus of the present invention includes a light source 100, an optical system 120, a front photo diode (FPD) 140, a diffraction element 160, and a photo diode integrated circuit (PDIC) 180.

The light source 100 includes a first light source 100a for use with DVD (Digital Versatile Disc), and a second light source 100b for use with CD (Compact Disc). Preferably, the light sources are laser diodes (LDs) that generate light beam having wavelength suitable for a particular media. For instance, the first light source 100a may emit light having a wavelength of 650 nm for use with a DVD, whereas the second light source 100b may emit light having a wavelength of 780 nm for use with a CD. Although the present exemplary embodiment illustrates two light sources which are suitable for use with CDs and DVDs, additional light sources emitting a light having a wavelength such as 405 nm for BDs (Blue-ray disc) and HD (High Definition)—DVDs can also be used.

The optical system 120 includes a first beam splitter 122, a second beam splitter 124, a reflecting mirror 126, a collimating lens (CL) 128, a ¼ (quarter) wavelength plate 130, an object lens (OL) 132, and a sensor lens (SL) 134.

Preferably, the first beam splitter 122 is a cubic beam splitter. The first beam splitter 122 reflects light emitted from the first light source 100a to change the optical path of that light, and transmits light emitted from the second light source 100b. This selective transmission is realized by utilizing the fact that the first and second light sources 100a, 100b emit light having different wavelengths from each other, or that the emitted lights have different polarization. Since beam splitting techniques are well known to those skilled in the art, further details are omitted for clarity and conciseness.

The second beam splitter 124 reflects part of the light from the first beam splitter 122 towards the FPD 140, and reflect the remainder towards the reflecting mirror 126.

The reflecting mirror 126 changes the path of the reflected light from the second beam splitter 124 to guide the light so that it is incident on the object lens 132.

The CL 128 collimates the reflected light from the reflecting mirror 126.

The quarter wavelength plate 130 changes linearly polarized light transmitted by the CL 128 into circularly polarized light, and changes circularly polarized light reflected from the disc to linearly polarized light. The function and operation of a quarter wavelength plate is also well-known to those skilled in the art, so further details are omitted for clarity and conciseness.

The object lens 132 focuses the light emitted from the quarter wavelength plate 130 onto the disc.

The sensor lens 134 consists of a concave lens, and magnifies the spot of a reflected light from the disc to form an effective (focal) spot by means of the PDIC 180. The sensor lens 134 is also able to generate astigmatism of the reflected light from the disc to produce an FE signal.

The FPD 140 receives part of the light emitted from the first and second light sources 100a, 100b, and measures the intensity of the emitted light. The result is provided to a controller (not shown) for controlling voltages to the first and second light sources 100a, 100b. In this manner, it is possible to control the intensity of the emitted light to maintain the intensity at a substantially constant level.

The diffraction element 160 includes a first diffraction element 160a for diffracting a light beam emitted from the first light source 100a, and a second diffraction element 160b for diffracting a light beam emitted from the second light source 100b. Since the first and the second diffraction element 160a, 160b are identical in their functions and configurations, a detailed description will only be provided for one of them.

Figure 4:
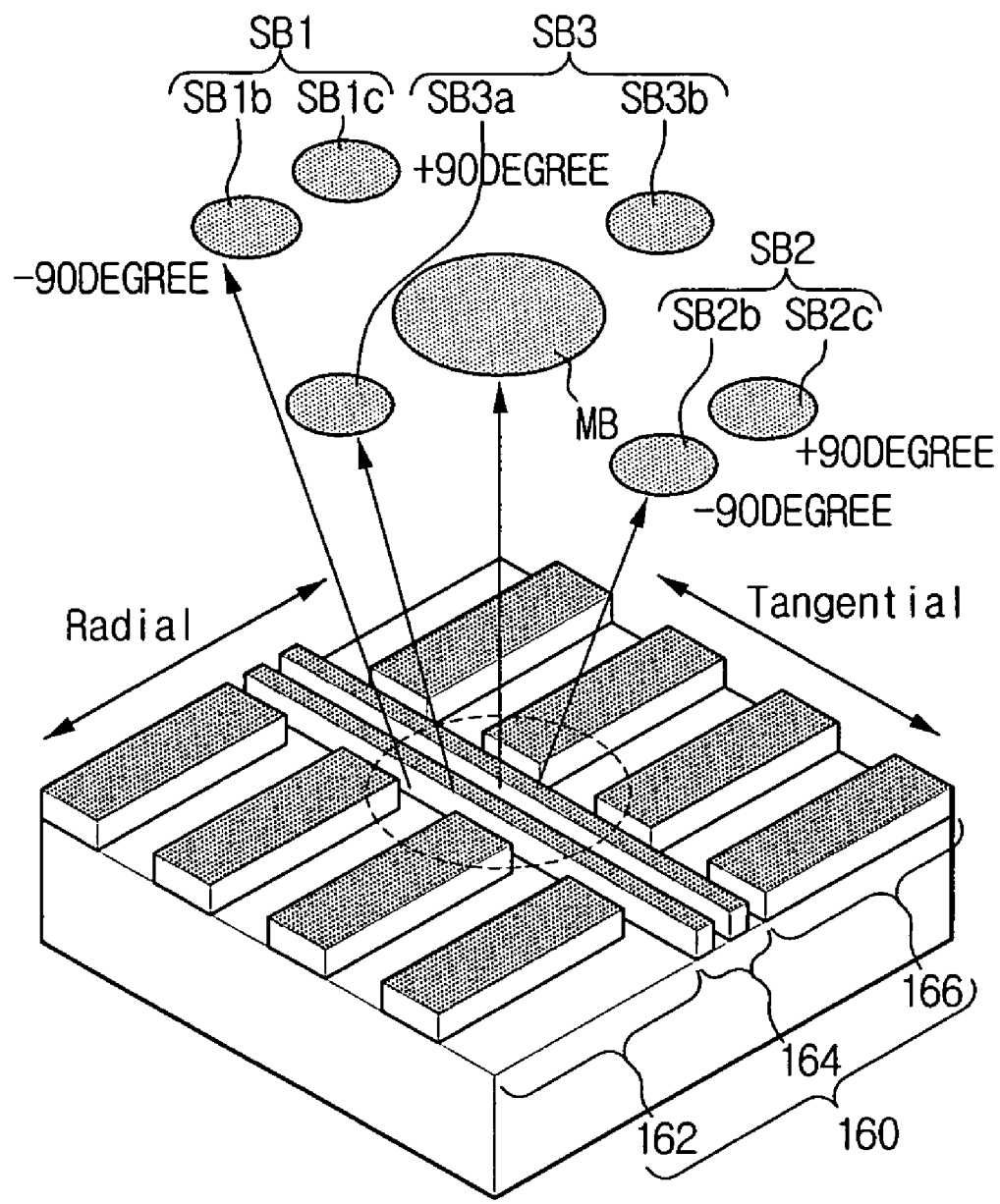
FIG. 4 is a perspective view of a diffraction element in FIG. 3.
Figure 5:
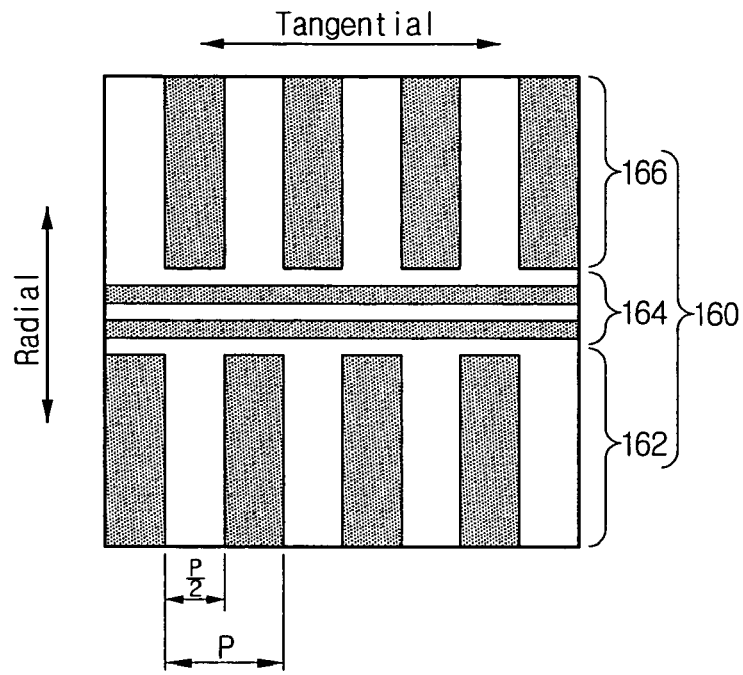
FIG. 5 is a front view of a diffraction element in FIG. 4.

Referring to FIG. 4 and FIG. 5, the diffraction element 160 is divided into three areas, a first, a second and a third area 162, 164, 166. The second area 164 is located between the first area 162 and the third area 166, and each area is composed of a diffraction grating having a constant period. In particular, the diffraction gratings of the first area 162 and the third area 166 are formed along the radial direction of the disc, so the diffraction element 160 forms a plurality of diffracted beams on one single track of the disc. Moreover, the diffraction gratings of the first area 162 and the third area 166 are dislocated by ½ pitch (P/2) from each other. Thus, a 180 degree phase difference is generated at the portion diffracted by the first and third areas 162, 166 of the sub-beams SB1, SB2 which are the ±1$^{st}$ order diffracted beams. In other words, the diffraction gratings of the first and third areas 162, 166 are offset by 180 degrees from each other. Meanwhile, the diffraction grating of the second area 164 is formed substantially perpendicularly to the diffraction gratings of the first and third areas 162, 166. That is, the diffraction grating of the second area 164 is formed in the tangential direction of the disc.

By the above-described diffraction element 160, a light beam emitted from the light source 100 is diffracted and split into one main beam MB and three sub-beams SB1, SB2, SB3.

The diffraction element 160 does not generate any phase difference in the main beam MB. Namely, the main beam MB has the same phase as the incident light on the diffraction element 160.

Among the three sub-beams SB1, SB2, SB3, the first and second sub-beams SB1, SB2 are diffracted in the tangential direction with respect of the main beam MB, whereas the third sub-beam SB3 is diffracted in the radial direction with respect to the main beam MB.

Then the first and second sub-beams SB1, SB2 are further split into two beams (SB1b, SB1c) (SB2b, SB2c), respectively, each being diffracted by the first area 162 and the third area 166 of the diffraction element 160. Here, the two beams in each pair (SB1b, SB1c) (SB2b, SB2c) have a 180 degree phase difference, respectively. That is to say, if one of beams SB1b, SB2b has a −90 degree phase difference with respect to the main beam MB, the other beam SB1c, SB2c has a +90 degree phase difference with respect to the main beam MB.

The third sub-beam SB3 is diffracted by the diffraction grating of the second area of the diffraction element 160, and split into two beams SB3a, SB3b that are formed in the radial direction of the disc.

The main beam MB and the three sub-beams SB1, SB2, SB3, each being split by the diffraction element 160, go through the first beam splitter 122, the second beam splitter 124, the reflecting mirror 126, the collimating lens 128, the quarter wavelength plate 130, and the object lens 132 in sequence (please refer to FIG. 3), and are irradiated onto a track of the disc. Then, the beams MB, SB1, SB2, SB3 are reflected and diffracted by the disc, and go through the object lens 132, the quarter wavelength plate 130, the collimating lens 128, the reflecting mirror 126, the second beam splitter 124, and the sensor lens 134 in sequence (please refer to FIG. 3) before they are finally irradiated onto the PDIC 180.

Figure 6:
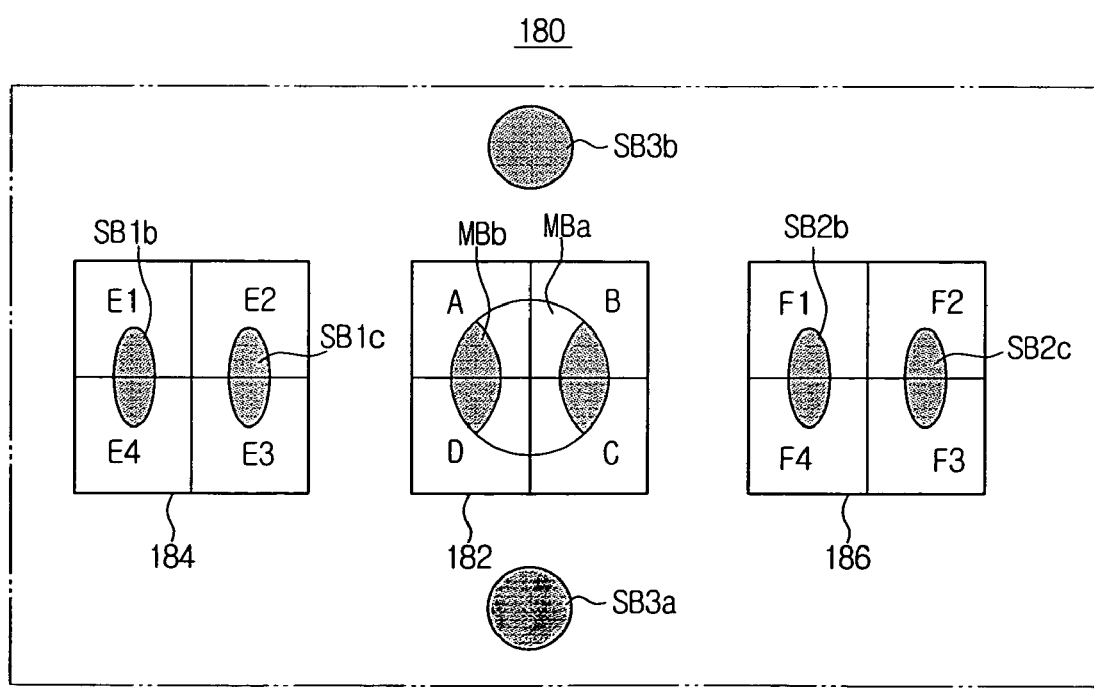
FIG. 6 is a front view illustrating a state where a diffracted light beam from a diffraction element in FIG. 4 is received by a photodetecting element.

The PDIC 180 and the reception of the beam by the PDIC 180 will now be described in detail. Referring to FIG. 6, the PDIC 180 is an element that converts a reflected beam from the disc into an electrical signal, and detects an RF (Radio Frequency) signal, an FE signal and a TE signal.

The PDIC 180 includes three photodetecting elements 182, 184, 186. Particularly, the photodetecting element 182 installed at the center is for use with the main beam, and is divided into four areas A, B, C and D. On the other hand, the photodetecting elements 184, 186 on both sides of the photodetecting element 182 are for use with the first and second sub-beams, and each is divided into four areas E1, E2, E3 and E4, and F1, F2, F3 and F4, respectively. These areas (A, B, C and D), (E1, E2, E3 and E4), and (F1, F2, F3 and F4) receive the main beam MB and the sub-beams SB1, SB2, and output detected electrical signals representing the intensities of the received beams. The RF signal, the FE signal and the TE signal are calculated from these electrical signals. For instance, the FE signal is obtained by the differential astigmatic method, and the TE signal is obtained by the DPP method. More details on these methods are provided below.

Suppose that the electrical signals detected from the areas (A, B, C and D), (E1, E2, E3 and E4), (F1, F2, F3 and F4) are (a, b, c, d), (e1, e2, e3, e4) and (f1, f2, f3, f4), respectively. The RF signal is generated by Equation 1, the FE signal is generated by Equation 2, and the TE signal is generated by Equation 3.

$$RF = a+b+c+d \quad \text{[Equation 1]}$$

$$FE = [(a+c)-(b+d)] + k[(e1+e3)-(e2+e4)+(f1+f3)-(f2+f4)]$$

$$k = (a+b+c+d)/(e1+e2+e3+e4+f1+f2+f3+f4) \quad \text{[Equation 2]}$$

$$MPP = (a+d)-(b+c)$$

$$SPP1 = (e1+e4)-(e2+e3)$$

$$SPP2 = (f1+f4)-(f2+f3)$$

$$SPP = SPP1 + SPP2$$

$$TE(DPP) = MPP - kSPP$$

$$k = (a+b+c+d)/(e1+e2+e3+e4+f1+f2+f3+f4) \quad \text{[Equation 3]}$$

Here, 'k' is a gain that compensates for the intensities of the ±1$^{st}$ order first and second sub-beams SB1, SB2, which have a lower intensity than the 0$^{th}$ order main beam.

Figure 7:
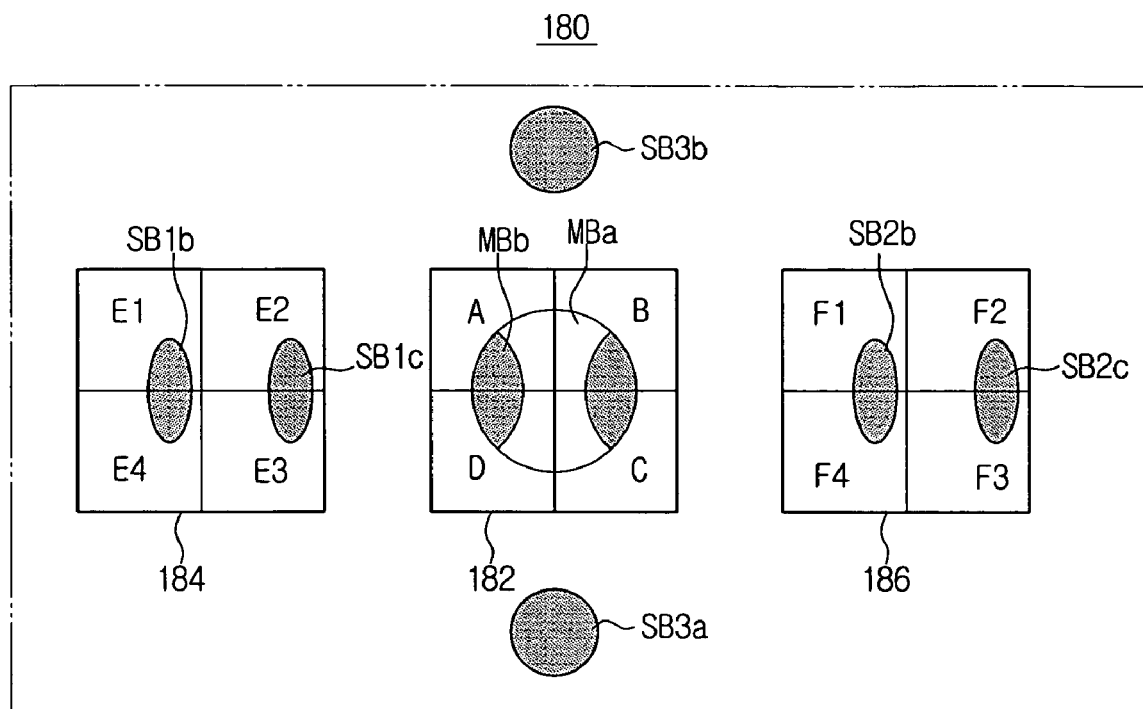
FIG. 7 is a schematic front view illustrating a state where a sub-beam on a photodetecting element is shifted because of an assembly error.

To see the status of a beam having been reflected from the disc and then received by the PDIC 180, the first and second sub-beams SB1, SB2 are diffracted from the disc and split into two beams (SB1*b*, SB1*c*) and (SB2*b*, SB2*c*), respectively. These beams are irradiated onto the first photodetecting element 184 and the second photodetecting element 186 for use with sub-beams, respectively. At this time, among the first and second sub-beams SB1, SB2, a beam diffracted by the second area (164 in FIG. 4) is deleted and the rest is received by the first and second photodetecting elements 184, 186. Namely, two beams (SB1*b*, SB1*c*) (SB2*b*, SB2*c*) are received separately by the first and second photodetecting elements 184, 186. Therefore, even if the diffraction element (160 in FIG. 4) or other optical elements are shifted in the tangential direction as shown in FIG. 7 due to assembly error, the SPP1 and the SPP2 value remain constant. In other words, although a light beam emitted from the light source (100 in FIG. 3) may not be incident on the center of the diffraction element 160 due to assembly error, the TF signal value is not changed.

Meanwhile, the third beam SB3 diffracted from the diffraction element 160 is received by none of the photodetecting elements 182, 184, 186 since the first and second photodetecting elements for use with sub-beams 184, 186 are arranged in the tangential direction of the disc. That is, the third beam SB3 is not required to calculate the FE and TE signals.

As explained so far, the present invention can be advantageously used for keeping the TE signal value constant even though the light beam emitted from the light source is not irradiated onto the center of the diffraction element due to an assembly error in the diffraction element or other optical elements. Therefore, irrespective of assembly error, a normal TE signal can be calculated.

While the invention has been shown and described with reference to certain embodiments thereof, it will be understood by those skilled in the art that various changes in form and details may be made therein without departing from the spirit and scope of the invention as defined by the appended claims.

What is claimed is:

1. A diffraction element for use in an optical pick-up apparatus, comprising
   a first diffraction grating area with a first predetermined period;
   a second diffraction grating area with a second predetermined period; and
   a third diffraction grating area with a third predetermined period,
   wherein the diffraction grating of the first area is substantially parallel to the diffraction grating of the third area, and the diffraction grating of the second area is substantially perpendicular to the diffraction gratings of the first and the third area, wherein the first predetermined period is equal to the third predetermined period and are dislocated one-half pitch from each other, and the diffraction gratings of the first and the third area are offset by 180 degrees from each other.

2. The diffraction element according to claim 1, wherein the diffraction gratings of the first and the third area are formed along the radial direction of an optical recording medium.

3. The diffraction element according to claim 1, wherein the diffraction grating of the second area is formed along the tangential direction of an optical recording medium.

4. An optical pick-up apparatus, comprising:
   a light source;
   a diffraction element divided into three areas, a first, a second and a third area, each comprising a diffraction grating with a predetermined period, and the second area being disposed between the first area and the third area, for diffracting a light beam emitted from the light source into three beams;
   an optical system for irradiating the beams diffracted by the diffraction element onto an optical recording medium, and guiding light reflected from the optical recording medium; and
   a photo diode integrated circuit (PDIC) for receiving light guided by the optical system, and detecting an RF signal, an FE signal, and a TE signal,
   wherein the diffraction grating of the first area is substantially parallel to the diffraction grating of the third area, and the diffraction grating of the second area is substantially perpendicular to the diffraction gratings of the first and the third area, and
   wherein the predetermined period of the diffraction grating of the first area is equal to the predetermined period of the diffraction grating of the third area and are dislocated one-half pitch from each other, and the diffraction gratings of the first and the third area are offset by 180 degrees from each other.

5. The optical pick-up apparatus according to claim 4, wherein
   the diffraction gratings of the first and the third area are formed along the radial direction of an optical recording medium.

6. The optical pick-up apparatus according to claim 5, wherein
   the light source comprises a first light source for a DVD and a second light source for a CD, and
   the diffraction element comprises a first and a second diffraction element for diffracting lights emitted from the first and the second light source, respectively.

7. The optical pick up apparatus according to claim 6, wherein the optical system comprises:
   a first beam splitter for changing the optical path of the light emitted from the first light source and transmitting the light emitted from the second light source;
   a second beam splitter for changing the optical path of the light emitted from the first beam splitter and guiding the light reflected from the optical recording medium towards the PDIC;
   a collimating lens for collimating the light emitted from the second beam splitter; and
   an optical objective lens for focusing the light from the collimating lens onto the optical recording medium.

* * * * *

UNITED STATES PATENT AND TRADEMARK OFFICE
CERTIFICATE OF CORRECTION

| | |
|---|---|
| PATENT NO. | : 7,609,607 B2 |
| APPLICATION NO. | : 11/254697 |
| DATED | : October 27, 2009 |
| INVENTOR(S) | : Bong-gi Kim |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 821 days.

Signed and Sealed this

Twelfth Day of October, 2010

David J. Kappos
*Director of the United States Patent and Trademark Office*